(12) United States Patent
Kim (10) Patent No.: US 8,117,257 B2
(45) Date of Patent: *Feb. 14, 2012

(54) DEVICE MANAGEMENT USING EVENT

(75) Inventor: Te-Hyun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 127 days.

This patent is subject to a terminal disclaimer.

(21) Appl. No.: 12/521,979

(22) PCT Filed: Nov. 21, 2007

(86) PCT No.: PCT/KR2007/005876
§ 371 (c)(1),
(2), (4) Date: Jul. 1, 2009

(87) PCT Pub. No.: WO2008/088125
PCT Pub. Date: Jul. 24, 2008

(65) Prior Publication Data
US 2009/0313326 A1    Dec. 17, 2009

(30) Foreign Application Priority Data
Jan. 18, 2007  (KR) .................. 10-2007-0005810
Jun. 14, 2007  (KR) .................. 10-2007-0058475

(51) Int. Cl.
*G06F 15/16* (2006.01)
*G06F 15/173* (2006.01)

(52) U.S. Cl. .................. 709/203; 709/223; 709/224

(58) Field of Classification Search .................. 709/203, 709/223–224
See application file for complete search history.

(56) References Cited

U.S. PATENT DOCUMENTS

| | | | | |
|---|---|---|---|---|
| 5,680,617 A | * | 10/1997 | Gough et al. | 715/201 |
| 5,887,135 A | * | 3/1999 | Dahlen et al. | 709/250 |
| 5,892,898 A | * | 4/1999 | Fujii et al. | 714/57 |
| 6,035,343 A | * | 3/2000 | Tsushima et al. | 719/318 |
| 6,167,448 A | * | 12/2000 | Hemphill et al. | 709/224 |
| 6,480,901 B1 | * | 11/2002 | Weber et al. | 709/246 |
| 6,697,695 B1 | | 2/2004 | Kurihara et al. | |
| 6,892,264 B2 | * | 5/2005 | Lamb | 710/301 |
| 2002/0184360 A1 | * | 12/2002 | Weber et al. | 709/223 |
| 2003/0221004 A1 | * | 11/2003 | Stupek et al. | 709/224 |
| 2006/0025991 A1 | | 2/2006 | Kim | |
| 2006/0064486 A1 | * | 3/2006 | Baron et al. | 709/224 |

FOREIGN PATENT DOCUMENTS

WO  WO-2006/006803 A1  1/2006
WO  WO-2006/075729 A1  7/2006

* cited by examiner

*Primary Examiner* — Minh-Chau Nguyen
(74) *Attorney, Agent, or Firm* — Birch, Stewart, Kolasch & Birch, LLP (57) ABSTRACT

In related art, the terminal can receive a particular task from a server, and perform the received particular task, only after the terminal reports to the server that a particular event has occurred. But, according to the present invention, the server provides the particular task in advance of the occurrence of the particular event. Therefore, the particular task can be performed by the terminal as soon as a particular event is occurred, so a waste of the network resources can be reduced. Meanwhile, according to the present invention, a routing service is provided between elements within the terminal, so that the elements within the terminal can be separated. In addition, according to the present invention, a source number and a registration number are used for the routing service, so that the routing service can be accurately operated. Moreover, malfunction of a processing unit can be prevented through the source number and the registration number, and performing of a task by a malicious user can be prevented.

19 Claims, 11 Drawing Sheets

```
<Alert>
<CmdID>2</CmdID>
<Data>1226</Data>  <!-- Generic Alert -->
<Item>
   <Source><LocURI>
./Buffer/Monitor  <!-- Trap source URI -->
</LocURI></Source>
   <Meta>
      <Type xmlns="syncml:metinf">
org.openmobilealliance.trap.100 <!-- Trap ID used is 100 -->
</Type>
      <Format xmlns="syncml:metinf">Chr</Format>
      <Mark xmlns="syncml:metinf">critical</Mark> <!-- optional -->
   </Meta>
   <Data>
      126 <!-Trap Variable, 126 byte left -->
   </Data>
</Item>
</Alert>
```

DEVICE MANAGEMENT USING EVENT

TECHNICAL FIELD

The present invention relates to a technique for managing a device (e.g., a terminal) and, more particularly, to a technique for managing a device by using an event.

BACKGROUND ART

In general, when a device (e.g., a terminal) uses hardware, e.g., a memory, or performs a function by using a battery, numerous events occur therein. In addition, when the device performs a function desired by a user by driving software, e.g., an application program, or a service, etc., numerous events also occur therein. The locally occurred events are transferred between internal hardware and software to perform the user-desired function overall.

In order to transfer or report the events occurring within the device to an entity located outside the device, new technologies are required. For this purpose, device management (DM) technique has been proposed.

The DM technique allows a DM server to access a particular device (or a client) (e.g., a terminal), namely, a target of the device management, and the device to report internally occurred events to the server.

In the DM technique, when the server wants to receive a report about an event from the device, it first makes a request for receiving the report about the event. Then, the device monitors internally occurring events, and when a corresponding event occurs, the device reports the event to the server. Then, the server analyzes the received event and takes a necessary action according to the analysis. When the event is reported, in most cases, the server may change a function of the device or start a certain processing.

DISCLOSURE OF INVENTION

Technical Problem

However, when types of events vary and events occur frequently, the process in which the server receives the events and takes necessary actions accompanies so many data transmissions and loads (operation or work). In addition, it incurs excessive costs. In particular, when the server handles thousands of devices, its loads may become a serious problem. As a result, the number of servers needs to be increased and the management costs would be much increased.

Technical Solution

Therefore, in order to address the above matters the various features described herein have been conceived. One aspect of the exemplary embodiments allows a server to previously schedule a task to be performed by a terminal for a situation where the server receives a report on an event from the terminal, and provide it to the terminal, to thus reduce a waste of network resources.

Another aspect of the exemplary embodiments is to provide a routing unit that handles routing of an event in order to strengthen security between a monitoring unit that monitors an event within a terminal and a processing unit that performs a particular task when an event occurs.

Still another aspect of the exemplary embodiments is to allow the routing unit to accurately route to a processing unit that is in charge of (that handles) the occurred event, and to allow a different processing unit not to perform a task even if it erroneously receives the event.

This specification provides a device management (DM) method using an event, comprising: a) receiving, from a server, a first request for monitoring whether or not a particular event is occurred; b) monitoring whether or not the particular event is occurred according to the first request; c) receiving, from the server, a second request for scheduling a particular task, which will be performed if the particular event is occurred; and d) performing the scheduled particular task according to the second request.

This specification also provides a device management (DM) method using an event comprising: a) obtaining, by a monitoring unit, information about an occurrence of a particular event, b) transferring, by the monitoring unit, a report message including an identification number and a registration number with respect to the occurred event, to a routing unit; c) routing, by the routing unit, the received report message to a processing unit; d) checking, by the processing unit, whether or not the identification number and the registration number of the report message are identical to those internally set; and e) performing, by the processing unit, a scheduled particular task when the numbers are identical.

This specification also provides a method for managing a terminal by using an event, comprising: a) transmitting a first request for monitoring whether or not a particular event is occurred, to a terminal; b) transmitting a second request for scheduling a particular task, which will be performed by the terminal if the particular event is occurred, to the terminal; and c) selectively receiving, from the terminal, results obtained by performing the scheduled task.

This specification also provides a terminal comprising: a monitoring unit that monitors occurrence of a particular event and transfers a report message including an identification number and a registration number with respect to the occurred event to a routing unit when the occurrence of a particular event is obtained; a routing unit that routes the received report message to a processing unit in charge; and the processing unit that checks whether or not the identification number and the registration number of the report message are identical to those internally set, and performing the scheduled particular task if the numbers are identical.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

MODE FOR THE INVENTION

In the accompanied drawings, a terminal is exemplarily shown, which may be referred to as a user equipment (UE) or a mobile equipment (ME), etc. In addition, the terminal can be a portable device such as a notebook computer, a mobile phone, a PDA, a smart phone, and a multimedia device, etc., or can be a non-portable device such as a PC or a vehicle-mounted device.

The exemplary embodiments of the present invention will now be described in detail with reference to the accompanying drawings.

Figure 1:
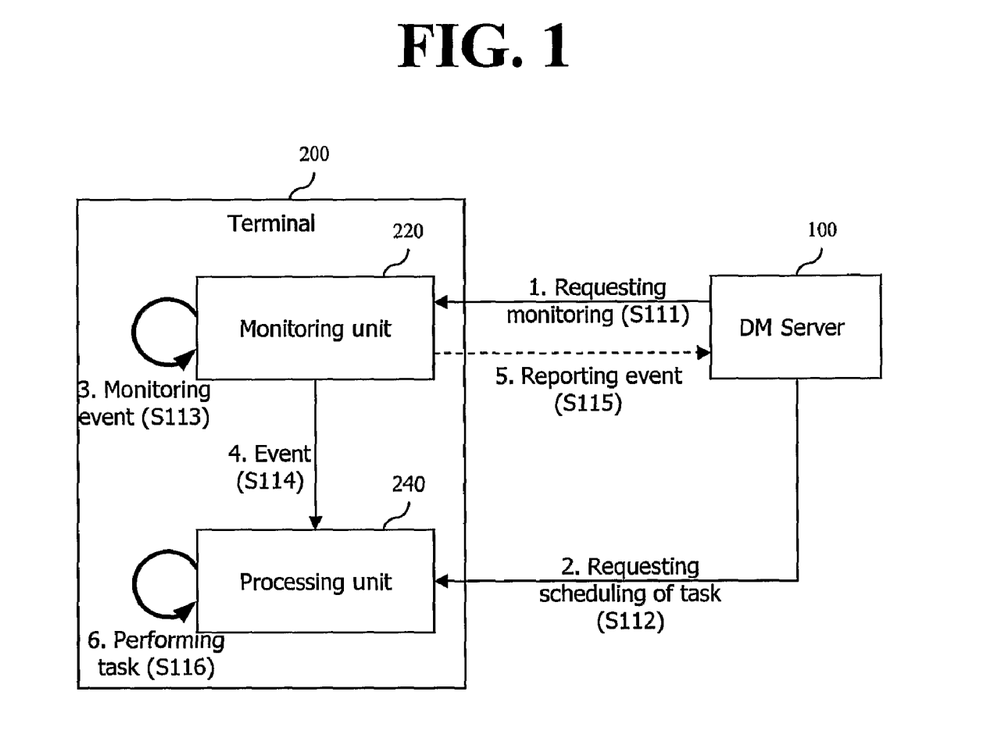
FIG. 1 is a view showing one example of a server and a terminal according to a first exemplary embodiment of the present invention.
Figure 2:
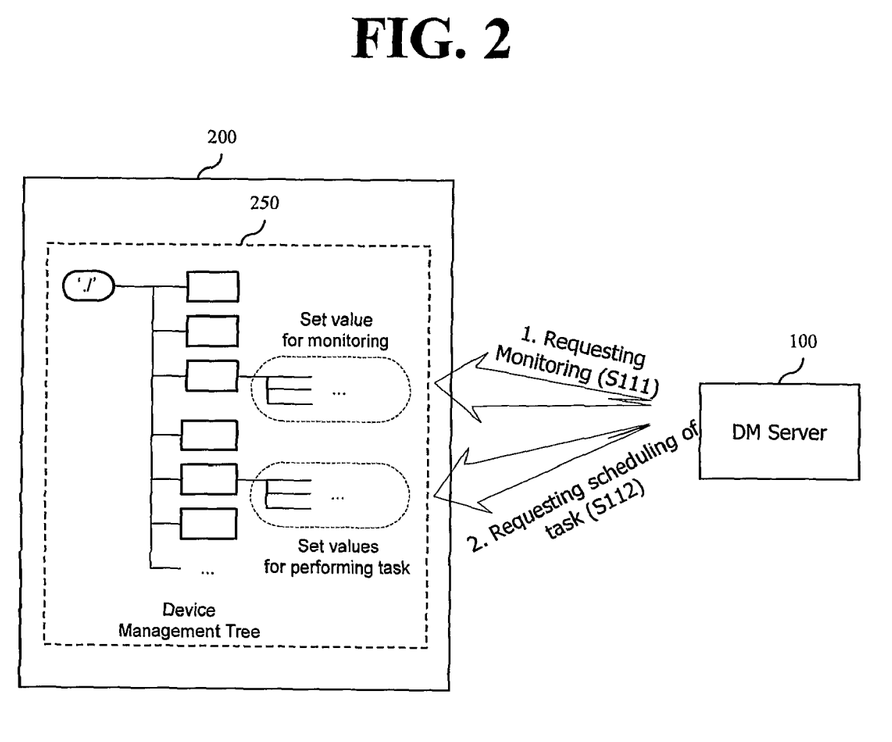
FIG. 2 is a view showing another example of the server and the terminal according to the first exemplary embodiment of the present invention.
Figure 3:
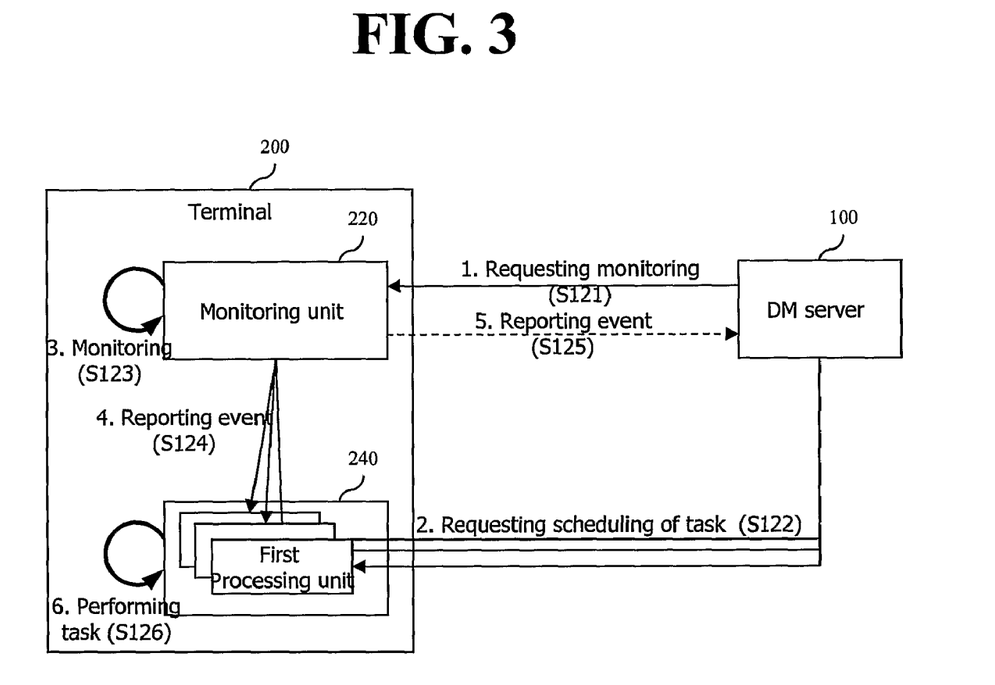
FIG. 3 is a view showing still another example of the server and the terminal according to the first exemplary embodiment of the present invention.
Figure 4:
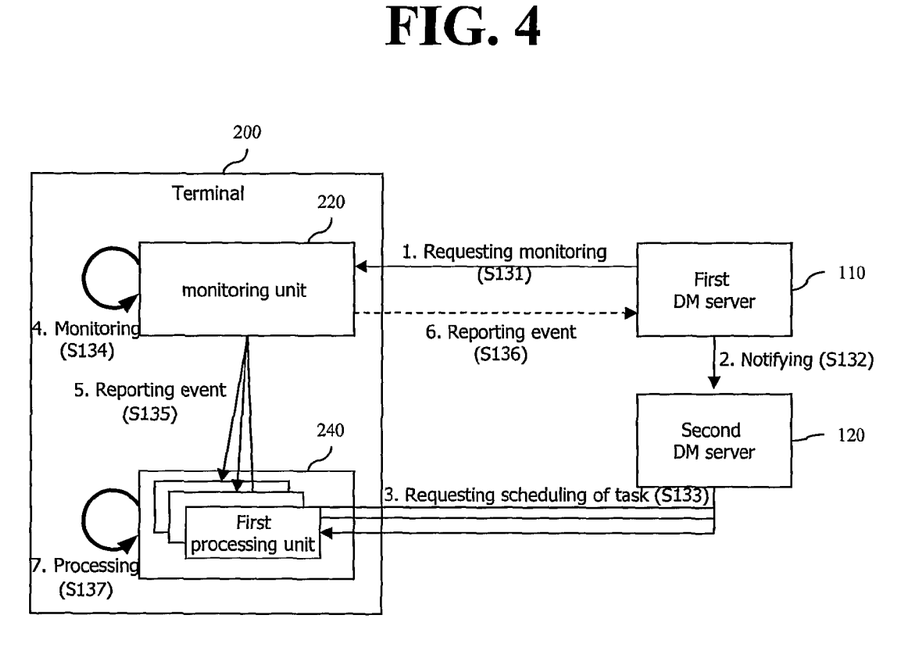
FIG. 4 is a view showing yet another example of the server and the terminal according to the first exemplary embodiment of the present invention.

FIG. 1 is a view showing one example of a server and a terminal according to a first exemplary embodiment of the present invention, FIG. 2 is a view showing another example of the server and the terminal according to the first exemplary embodiment of the present invention, FIG. 3 is a view showing still another example of the server and the terminal according to the first exemplary embodiment of the present invention, and FIG. 4 is a view showing yet another example of the server and the terminal according to the first exemplary embodiment of the present invention.

First, with reference to FIG. 1, a device management (DM) server 100 requests a terminal 200 to monitor a particular event (S111), and requests scheduling a particular task to be performed when the particular event occurs (S112). In this case, the event monitoring request (S111) and the scheduling request (S112) can be performed at the same time.

The terminal may include a monitoring unit 220 and a processing unit 240. The monitoring unit 220 monitors events (S113) according to the request (S111). In this case, before performing monitoring (S113), the monitoring unit 220 may check whether or not the DM server 100 is an authenticated server or whether or not the DM server 100 has a proper right. If the DM server 100 has no proper right, the monitoring unit 220 may reject the request. When the particular event occurs, the monitoring unit 220 transfers the event to the processing unit 240 (S114). In this case, the monitoring unit 200 may check whether the event has been properly transferred. And the monitoring unit 220 selectively reports the event to the DM server 100 (S115).

Upon receiving the event (S114), the processing unit 240 performs the particular task scheduled by the DM server 100 (S116). In this case, the processing unit 240 may verify the received event to check whether it is a proper event, and then perform the particular task.

As shown in FIG. 2, the terminal 200 may further include a managed object 250.

The managed object 250 provides resources or set values of the terminal 200 in the form of a managed object existing in the tree to the DM server 100 so that the DM server 100 can access the terminal 200 through the managed object in the form of the tree to thus easily manage the terminal 200.

Accordingly, the DM server 100 transmits the set values for monitoring in the managed object 250 of the terminal 200, to achieve the request for monitoring (S111). In this case, the set value for monitoring in the managed object 250 can be corrected or deleted only by the DM server 100. The DM server 100 can achieve the request for scheduling the particular task (S112) by transmitting a set value with respect to the particular task to the managed object 250 of the terminal 200. In this case, the task set value in the managed object 250 can be corrected or deleted only by the DM server 100.

The event monitoring request (S111) and the scheduling request (S112) can be simultaneously performed. Namely, the DM server 100 may transmit context including the set value for monitoring and the set value with respect to the particular task to the managed object 250.

Meanwhile, as shown in FIG. 3, there may be multiple processing units 240 in the terminal 200.

In addition, as shown in FIG. 4, there may be two types of DM servers. For example, a first DM server 110 (e.g., called a diagnosing server) may request monitoring, and a second DM server 120 (e.g., a scheduling server) may request the scheduling of performing of a task.

The operation when the two types of servers 110 and 120 are provided will now be described. First, the first DM server 110 requests the terminal 200 to monitor occurrence of a particular event (S131), and informs the second DM server 120 that it has requested monitoring (S132). Then, the second DM server 120 requests scheduling the particular task to be performed in case where the particular event occurs (S133). Other content is similar to that of FIG. 1, so a description thereof will be omitted.

Meanwhile, in the first exemplary embodiment, there is a possibility that when the DM server 100 is malfunctioned, it may erroneously control the terminal 200.

For example, although the second DM server 120 has the exclusive right to request the performing of the task from the processing unit 240 of the terminal 200, when the first DM server 110 is malfunctioned, it may request performing of an erroneous task from the processing unit 240 of the terminal 200 and erroneously control the terminal 100.

Meanwhile, when the processing unit 240 is malfunctioned or if an arbitrary event occurs by a malicious user, the terminal may perform an erroneous task.

Thus, the present invention proposes a second embodiment aimed at strengthening security.

Figure 5:
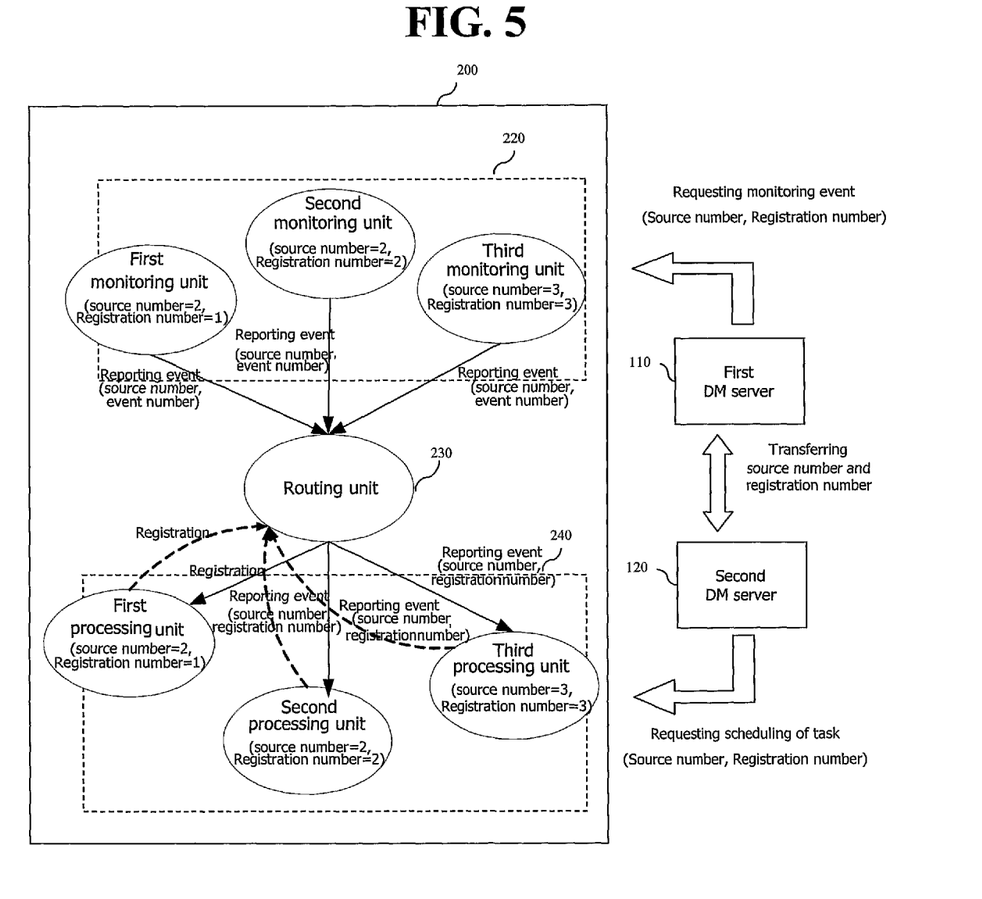
FIG. 5 is a view showing a server and a terminal according to a second exemplary embodiment of the present invention.

FIG. 5 is a view showing a server and a terminal according to a second exemplary embodiment of the present invention.

As shown in FIG. 5, in the second embodiment of the present invention, in order to strengthen security, a routing unit 230 is provided between the monitoring unit 220 and the processing unit 240, thereby separating the monitoring unit 220 and the processing unit 240. In this case, the routing unit 230 may exist independently, or may be divided to exist in the monitoring unit 220 or the processing unit 240. In the second embodiment of the present invention, the routing unit 230 routes the event by using a source number and a registration number to thus separate the monitoring unit 220 and the processing unit 240, and even if there are several processing units, routing can be accurately performed.

The second embodiment of the present invention will now be described in detail.

1) When the first DM server 110 requests the monitoring unit 220 to monitor a particular event (or when the first DM server 110 requests reporting of a particular event), it provides a source number (identification number) and a registration number with respect to the particular event. In this case, the source number has a specific value according to types of events. The source number can be designated by a communication service provider, a terminal manufacturer, an officially approved institution (agency) or a private institution (agency). The registration number is used to discriminate each event when two or more events of the same type occur. The registration number can be determined as the DM server 100 proposes and the monitoring unit 220 admits the proposed registration number. Alternatively, the registration number may be determined such that when the DM server 100 requests the registration number, the monitoring unit 220 determines the registration number and provides it to the DM server 100.

The reason for transmitting the source number and the registration number is to clearly discriminate each role when there are multiple monitoring units 220 or when there are multiple processing units 240 of the terminal 200. For example, when the first and second monitoring units monitor occurrence of an event of source number 2, the first monitoring unit monitors an event of a registration number 1 while the second monitoring unit monitors an event of a registration number 2 to thus clearly discriminate each role. In addition, by using the source number and registration number, the routing unit 230 can accurately perform routing. For example, when the first processing unit handles a task with respect to an event of a source number 2 and a registration number 1 and the second processing unit handles a task with respect to an event of a source number 2 and a registration 2, if the routing unit 230 receives an event of a source number 2 and a registration number 2 from the second monitoring unit, it can accurately transfer the event to the second processing unit.

2) Upon receiving the request for monitoring of the event, the monitoring unit 220 checks authentication information and right of the DM server 100, and then starts monitoring of the event. The right can be checked by verifying access rights of the DM server 100 with respect to the above-described managed object 250.

3) The first DM server 100 transfers the source number and the registration number to the second DM server 120. In this case, the source number and the registration number can be transferred through an encrypted channel in order to prevent a leakage of the source number and the registration number and thus increase reliability of security.

4) Then, the second DM server 120 requests the scheduling of performing of a particular task by the processing unit 240 when the particular event occurs. At this time, the source number and the registration number are transferred together.

5) Then, the processing unit 240 checks the authentication information and right of the DM server 100. The right can be checked by verifying access rights of the DM server 100 with respect to the managed object.

6) The processing unit 240 registers the source number and the registration number to the routing unit 230. In this case, besides the source number and the registration number, a matter with respect to an event transfer method can be registered. For example, a call-back function pointer may be registered, through which the event report can be received.

7) Thereafter, when the particular event occurs, the monitoring unit 220 transfers a report message to the routing unit 230. In this case, the report message includes the occurred event, the source number and the registration number. In addition, the report message may also include a URI (Uniform Resource Identifier) with respect to the occurred event and a variable of the event (simple information that may additionally describe the event).

8) Then, the routing unit 230 checks the source number and the registration number of the received report message, and then, checks whether there is a processing unit which has been registered with the same source number and registration number. The routing unit 230 transfers the report message to the checked processing unit 240.

9) Upon receiving the report message, the processing unit 240 verifies the source number and the registration number, and performs a predetermined task.

As stated above, in the second embodiment of the present invention, the routing unit 230 is provided and the source number and the registration number are used to thus strength security.

Figure 6:
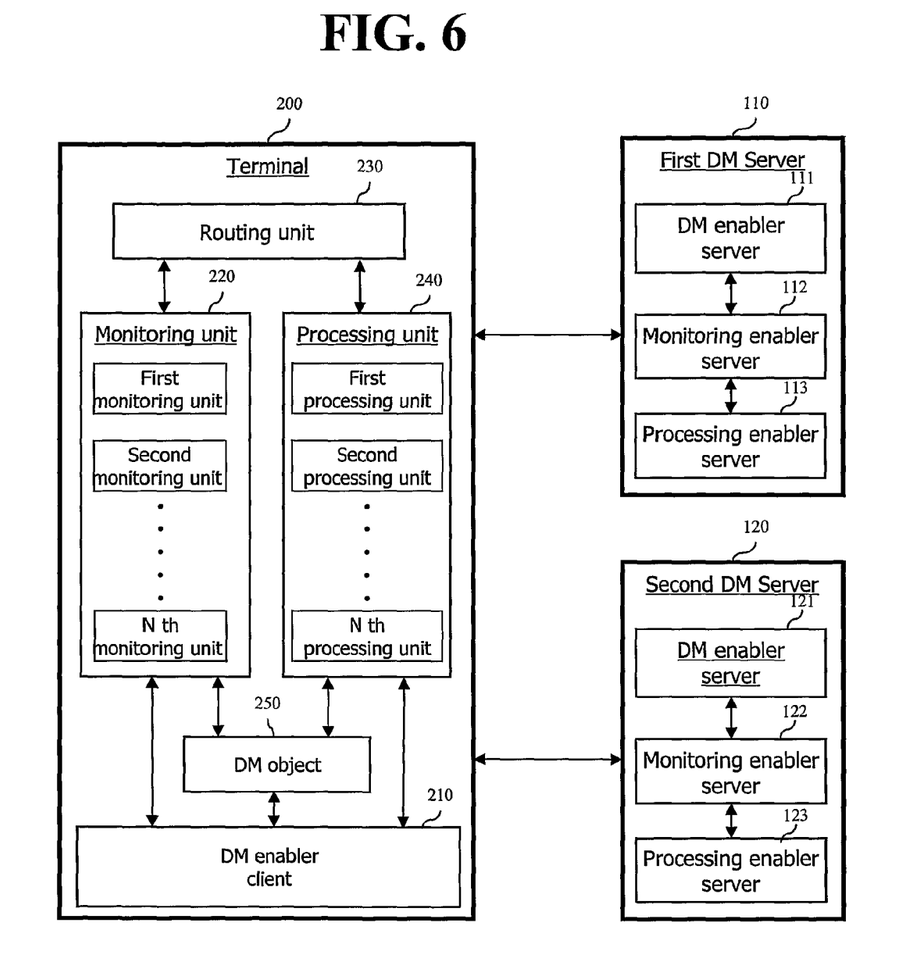
FIG. 6 is a schematic block diagram showing the construction of the server and the terminal according to the first and second exemplary embodiments of the present invention.

FIG. 6 is a schematic block diagram showing the construction of the server and the terminal according to the first and second exemplary embodiments of the present invention.

With reference to FIG. 6, the first DM server 110 and the second DM server 120 include DM enabler servers 111 and 121, monitoring enabler servers 112 and 122, and processing enabler servers 113 and 123.

The DM enabler servers 111 and 121 provide an interface with the terminal 100. Namely, the monitoring enabler servers 112 and 122 may request the terminal 200 to monitor a particular event through the DM enabler servers 111 and 121. In addition, the processing enabler servers 113 and 123 may request the scheduling of performing of a particular task by the terminal 200 through the DM enabler servers 111 and 121.

In addition, the DM enabler servers 111 and 121 receive a report on an occurred particular event from the terminal 200 and transfer it to the monitoring enable servers 112 and 122. In addition, the DM enabler servers 111 and 121 receive results obtained by performing the particular task from the terminal 200 and transfer them to the processing enabler servers 113 and 123.

As mentioned above, the monitoring enabler servers 112 and 122 may request the terminal 200 to monitor whether or not a particular event occurs. In addition, the monitoring enabler servers 112 and 122 may receive a report on the occurred particular event from the terminal 200.

The processing enabler servers 113 and 123 may request scheduling the particular task to be performed by the terminal 200, and may receive results obtained by performing the task from the terminal 200.

As mentioned above, the first DM server 110 may handle requesting the terminal 20 to monitor the event and the second DM server 120 may handle requesting of scheduling such that the terminal 200 performs the particular task. Thus, the first DM server 110 may be called a diagnosing server and the second DM server 120 may be called a scheduling server.

The terminal 200 may include a DM enabler client 210, the monitoring unit 220, the routing unit 230, the processing unit 240, and the managed object 250.

The DM enabler client 210 is connected with the monitoring unit 220 and the processing unit 240 and provides an interface with the first and second DM servers 110 and 120. Namely, the DM enabler client 210 may receive a request for monitoring a particular event from the first DM server 110 or may receive a request for scheduling a particular task to be performed from the second DM server 120. In addition, the DM enabler client 210 may allow the monitoring unit 220 to report on an occurred particular event to the first or second DM server 110 or 120.

The monitoring unit 20 is connected with the DM enabler client 210, the routing unit 230 and the managed object 250. As mentioned above, when the monitoring unit 220 receives a request for monitoring whether or not the particular occurs from the first DM server 110, the monitoring unit 220 checks authentication information of the first DM server 110 and checks whether or not the first DM server 110 has proper authority (rights). In addition, in order to perform the requested monitoring, the monitoring unit 220 may check a set value in the managed object 250. When the requested particular event occurs, the monitoring unit 220 transfers the report message to the routing unit 230. In this case, the report message includes the occurred event, and a source number and a registration number with respect to the event. As shown, there may be multiple monitoring units 220.

The routing unit 230 is connected with the monitoring unit 220 and the processing unit 240. When the routing unit 230 receives the report message with respected to the occurred event from the monitoring unit 220, it routs the report message to a suitable processing unit.

The processing unit 240 is connected with the DM enabler client 210, the routing unit 230, and the managed object 250. As mentioned above, when the processing unit 240 receives the request for scheduling the task from the second DM server 120, it checks the authentication information of the second DM server 112 and also checks whether the second DM server 112 has the proper right (or authority). In addition, in order to perform the requested monitoring, the processing unit 240 may check a set value of the managed object 250. The processing unit 240 may transmit results obtained by performing the particular task to the DM server 100.

As stated above, the managed object 250 provides resources of the terminal 200 or the set value in the form of the managed object existing in the tree to the DM server 100, so that the DM server 100 may access the terminal 200 through the tree. Namely, as mentioned above, the managed object 250 includes the set value for monitoring and the set vale with respect to the task. The managed object 250 will now be described in detail with reference to FIG. 7.

Figure 7:
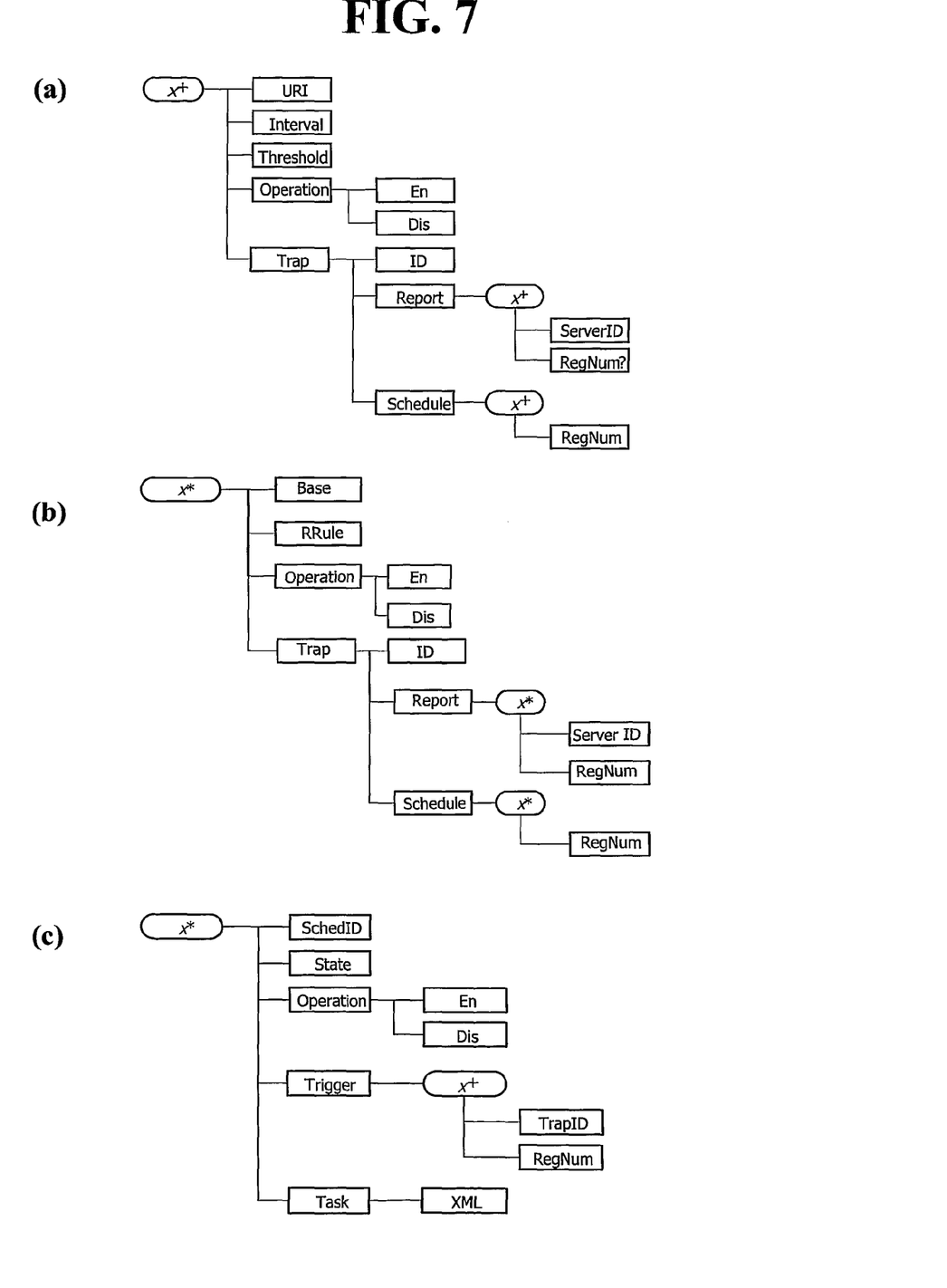
FIG. 7 is a view showing a managed object in the form of a tree.

FIG. 7 is a view showing the managed object in the form of a tree.

With reference to FIG. 7, it is noted that FIGS. 7a and 7b show managed objects including the set value for monitoring the particular event, and FIG. 7c shows a managed object including the set value for performing the particular task.

First, the managed object of FIG. 7a can be used to make an event occur when a certain value of the terminal 200 reaches a threshold value, and then to transfer a report message with respect to the occurred event to the DM server 100 or the routing unit 230.

The managed object of FIG. 7a includes a 'URI' element (or node) that designates an address of a variable, namely, a target of monitoring, an 'Interval' element that designates a period for sampling a value of the variable, a 'Threshold' element that designates a threshold value with respect to the variable, an 'Operation' element that indicates a start or an end of the monitoring, and a 'Trap' element that indicates an event to occur when the value of the variable reaches the threshold value.

The 'Operation' element includes an 'enable' element (En) that indicates the start of monitoring and a 'disable' element (Dis) that indicates the end of monitoring.

The 'Trap' element includes an 'ID' element that indicates a source number (or identification number) of the event to occur when the value of the variable reaches the threshold value, a 'Report' element that indicates a target to which a report message with respect to the occurred event is to be transmitted, and a 'Schedule' element including required information when the occurred event is transferred to the routing unit 230.

The 'Report' element includes a 'Server ID' element that indicates an ID of a DM server to which the report message with respect to the occurred event is to be transmitted, and a 'registration number' (RegNum) element that indicates a registration number to be included in the report message. In this case, 'x+' indicates that multiple registration numbers may exist. As for the 'Report' element, in order for the DM server to receive a report when the particular event occurs, the DM server should transfer its ID in the 'Sever ID' element and records a registration number with respect to the event in the 'registration number' (or, RegNum) element.

Meanwhile, the 'Schedule' element includes a 'registration number' (or, RegNum) element that indicates a registration number to be included in the report message with respect to the event as occurred, when the report message is transferred to the routing unit 230 (or the processing unit 240). As for the 'Schedule' element, for example, the DM server 100 should record the registration number in the 'RegNum' element in order allow the particular task to be performed when the particular event occurs.

Referring to the registration, the DM server 100 generates a certain value that can be hardly estimated by someone and transmits it to the 'RegNum' element (or, node) of the managed object 250. Then, the terminal 200 checks whether the registration number is unique. If the registration number is not unique, the terminal 200 itself generates a unique registration number and transfers it to the server 100.

The managed object of FIG. 7b can be used to make an event occur when a particular time point, a particular period of time, a particular term, or a particular time interval arrives, and transfer a report message with respect to the occurred event to the DM server 100 or the routing unit 230.

The managed object of FIG. 7b includes a 'Base' element that designates a time condition, a 'Recursive Rule' (or, RRule) element that designates repetitiveness of the time condition, the above-mentioned 'Operation' element, and the above-mentioned 'Trap' element. The 'Base' element may designate the particular time point, the particular period of time, the particular term, and the particular time interval.

The managed object of FIG. 7c may be used when the DM server 100 makes the scheduling the particular task when the particular event occurs.

The managed object of FIG. 7c includes a 'Schedule ID' (SchedID) element that indicates an ID of a scheduled task, a 'State' element that indicates a state of the scheduled task, an 'Operation' element that indicates a start or an end of the scheduled task, a 'Trigger' element that indicates when the scheduled task is to be performed, namely, a condition for performing the task, and a 'Task' element that indicates the task to be performed.

The 'Trigger' element includes a 'Trap ID' element that indicates a source number (i.e., an identifier) of the particular event that triggers performing of the particular task, and a 'Registration number' (or, RegNum) element that indicates a registration number of the particular event that triggers performing of the particular task.

Namely, in order to perform the particular task, a source number designated in the 'Trigger/x/TrapID' element should be identical to the source number of the 'Trap/ID' element of the managed object of FIG. 7a or the managed object of FIG. 7b, and a registration number designated in the 'Trigger/x/RegNum' element should be identical to the registration designated in the 'Trap/Schedule/x/RegNum' of the managed object of FIG. 7a or the managed object of FIG. 7b.

The 'Task' node includes an element that designates a format of the particular task. Namely, the 'Task' node may include an XML (eXtensible Markup Language) element that designates a task of an XML format or a 'Binary' element that designates a task of a binary format.

Figure 8:
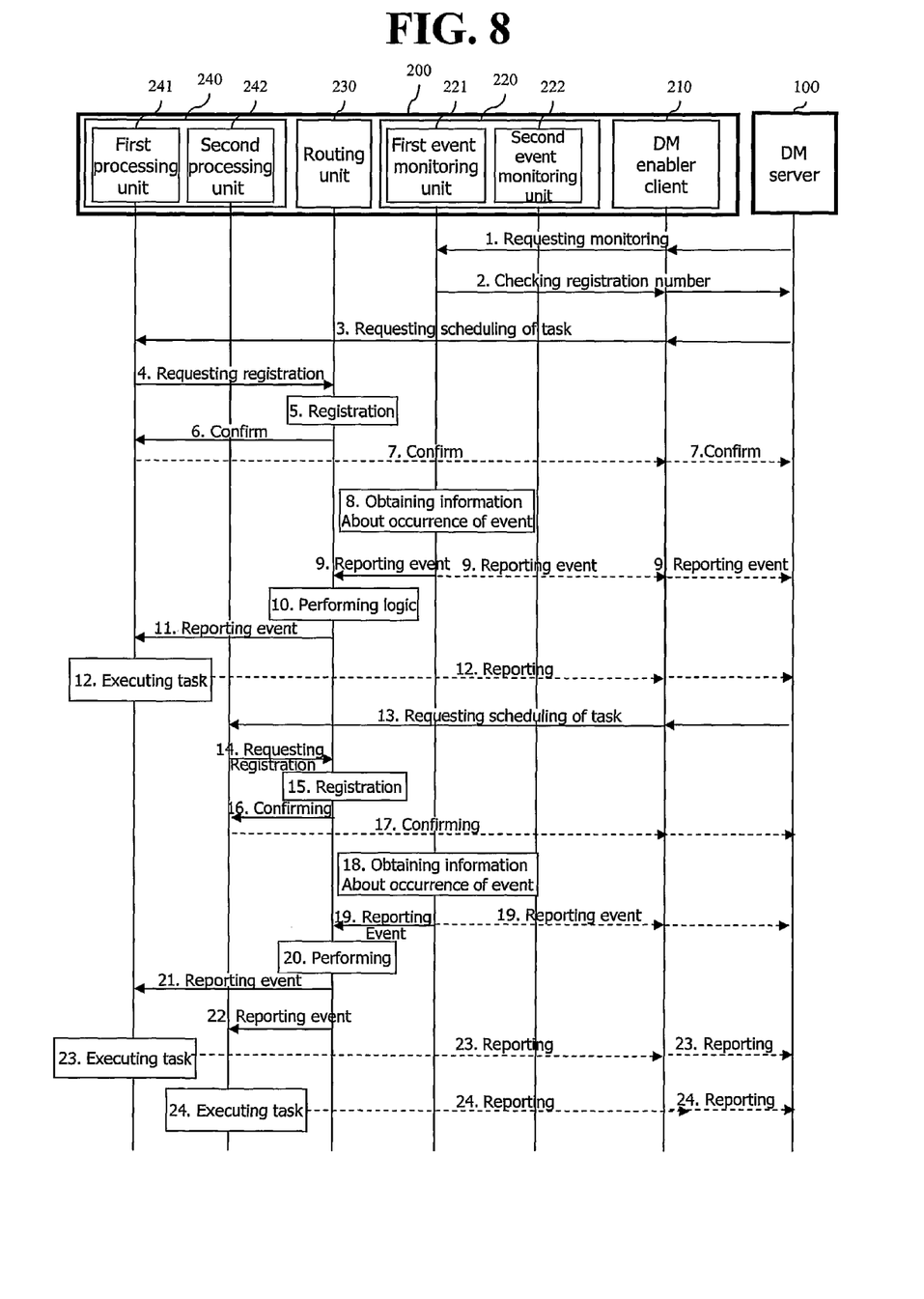
FIG. 8 is a view showing one example of a process according to the exemplary embodiment of the present invention.

FIG. 8 is a view showing one example of a process according to the exemplary embodiment of the present invention.

Specifically, FIG. 8 shows a process when there are two monitoring units 220 and two processing units 240.

1) The DM server 100 requests the first event monitoring unit 221 of the terminal 100 to monitor a particular event through the DM enabler client 210. In this case, as mentioned above, the source number and the registration number may be transferred together. Besides, a set value for the monitoring can be additionally transferred.

2) in response to the request, the first event monitoring unit 221 checks authentication information and right (authority) of the DM server 100. The first event monitoring unit 221 verifies uniqueness of the registration number proposed by the DM server 100. The first event monitoring unit 221 transmits a confirmation response with respect to the registration number to the DM server 100 through the DM enabler client 210.

3) The DM server 100 requests scheduling a first task to be performed by the first processing unit 241 in case where the particular event occurs through the DM enabler client 210. At this time, as mentioned above, the source number and the registration number may be transferred together. Besides, a set value for performing the first task may be also transferred.

4) The first processing unit 241 requests the routing unit 230 to transfer a report message with respect to the particular event. At this time, the source number and the registration number are registered together.

5)~6) The routing unit 230 performs registration according to the request, and updates an internal routing rule. And the routing unit 230 transmits a confirmation response to the first processing unit 241.

7) The first processing unit 241 transmits the confirmation response to the DM server 100 through the DM enabler client 210.

8)~9) Thereafter, the first event monitoring unit 211 obtains that the particular event has occurred. Then, the first event monitoring unit 211 transfers a report message with respect to the occurred event to the routing unit 230. The report message includes the source number and the registration number of the particular event. In addition, the first event monitoring unit 211 selectively transfers the report message with respect to the occurred event to the DM server 100.

10)~11) The routing unit 230 performs an internal logic. Namely, the routing unit 230 determines to which processing unit it would transfer the report message with reference to a routing rule. And then, the routing unit 230 transfers the report message to the determined first processing unit 241.

12) The first processing unit 241 verifies the received report message and checks whether the reported message is related to the particular event it has registered. In this case, the first processing unit 214 performs the checking by comparing the source number and the registration number of the report message with those designated for the particular task. If the numbers are identical, the first processing unit 241 performs the first task. And then, the first processing unit 241 selectively transfers results obtained by performing the task to the DM server 100 through the DM enable client 210.

13)~17) The DM server 100 requests scheduling a second task to be performed by the second processing unit 242 in case where the particular event occurs, through the DM enabler client 210.

18)~19) Thereafter, the first event monitoring unit 211 obtains that the particular event has occurred. Then, the first event monitoring unit 211 transfers a report message with respect to the occurred event to the routing unit 230. In this case, the report message includes a source number and a registration number with respect to the occurred particular event.

20)~22) The routing unit 230 transfers the report message to the first and second processing units 241 and 242.

23)~24) The first processing unit 241 performs the first task, and the second processing unit 242 performs the second task.

Figure 9:
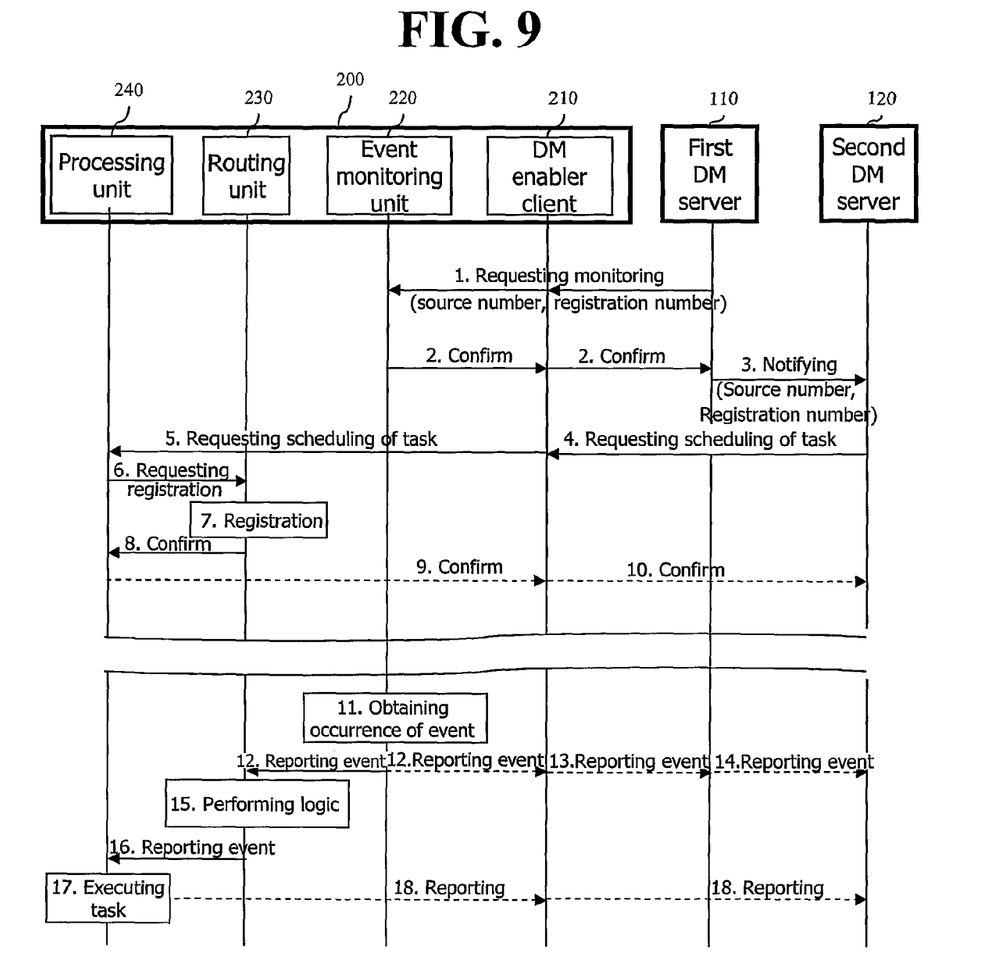
FIG. 9 is a view showing another example of a process according to the exemplary embodiment of the present invention.
Figure 10:
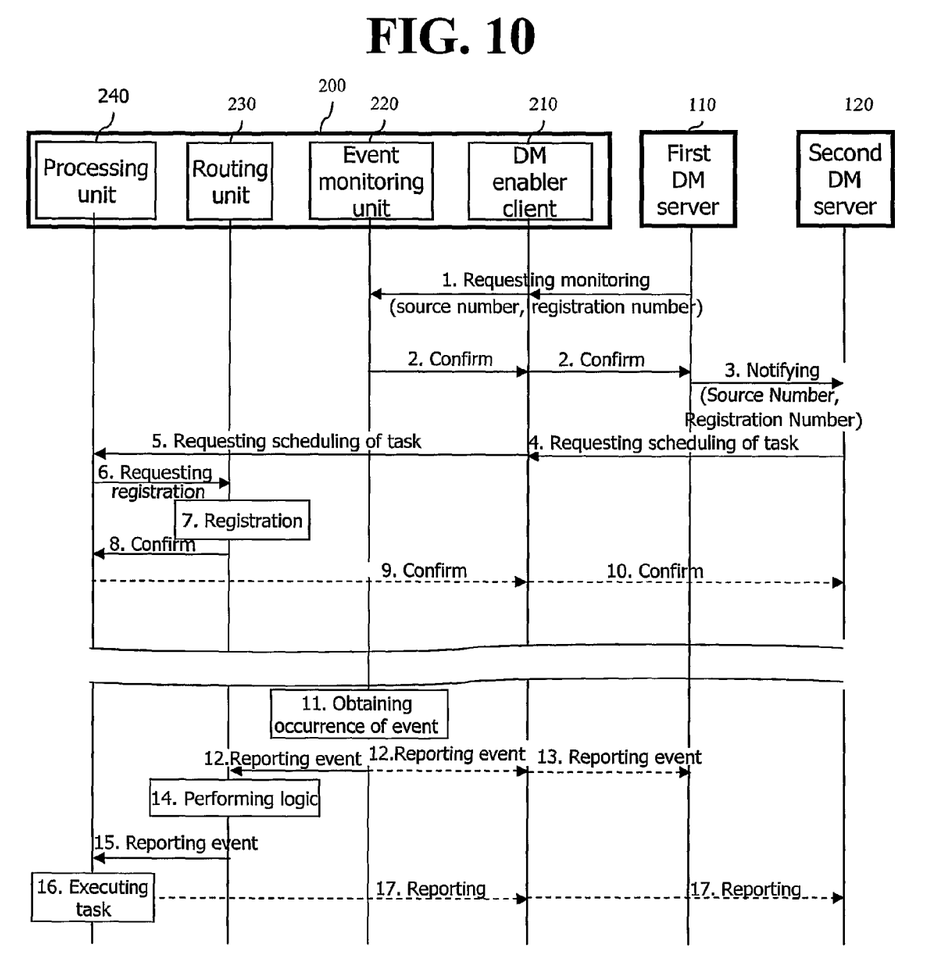
FIG. 10 is a view showing still another example of a process according to the exemplary embodiment of the present invention.

FIG. 9 is a view showing another example of a process according to the exemplary embodiment of the present invention, and FIG. 10 is a view showing still another example of a process according to the exemplary embodiment of the present invention.

Specifically, FIGS. 9 and 10 show processes when two or more DM servers exist.

First, FIG. 9 shows a process in which the first DM server 110 requests the terminal 100 to monitor a particular event and the second DM server 120 requests scheduling a particular task to be performed by the terminal 100 in case where the particular event occurs. This is similar to the above-described content, so a detailed description thereof will be omitted.

FIG. 10 shows a process in which when the second DM server 120 has no right (or, authority) to request monitoring, it request monitoring of a particular event through the first DM server 110. This is also similar to the above-described content, so a detailed description thereof will be omitted.

The method according to the present invention can be implemented by software, hardware or their combination. For example, the method according to the present invention may be stored in a storage medium (e.g., an internal memory of a mobile terminal, a flash memory, a hard disk, etc.) or may be implemented by codes or commands within a software program that can be executed by a processor (e.g., an internal microprocessor of the mobile terminal).

Figure 11:
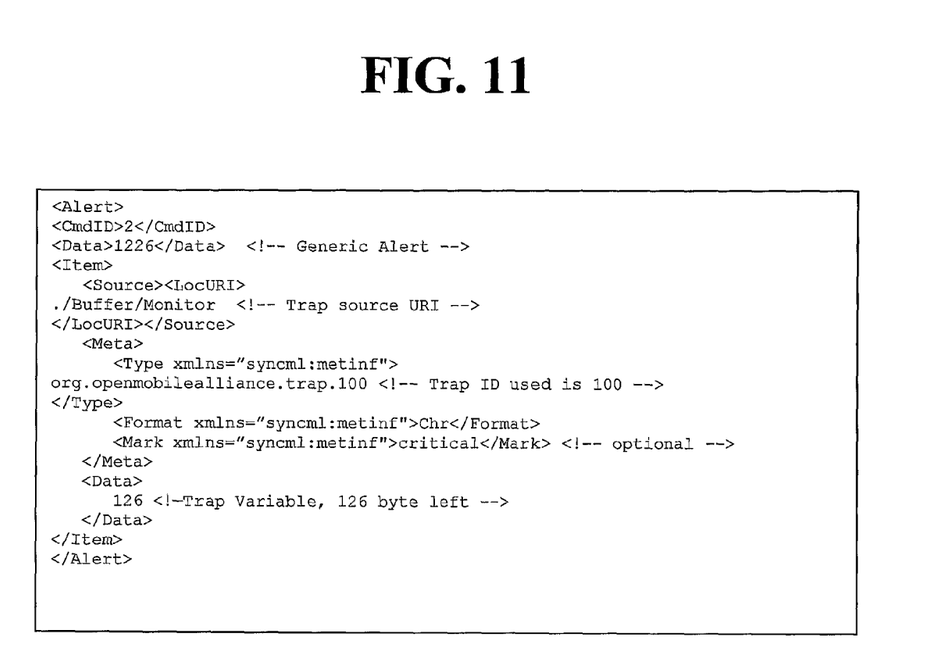
FIG. 11 is a view showing a message reported to a server.

FIG. 11 is a view showing a message reported to the DM server.

Specifically, FIG. 11 shows a message for notifying the DM server 100 about the occurrence of the particular event when the particular event occurs, or a message for notifying about results obtained by performing the particular task.

First, the message may include a source number (or an identification number or a Trap ID) with respect to the occurred particular event, an address (URI) of the monitoring unit that has captured the occurrence of the particular event, the registration number, and one or more of variables of the occurred event. Here, the address allows identifying of a monitoring unit, among multiple monitoring units, whereby the particular event has occurred. The variable is a value that may describe in detail the particular event when the particular event has occurred. For example, in case of monitoring a threshold value with respect to a particular variable, the variable can be a value of the particular variable.

The message in FIG. 11 exemplarily shows a format of the message transferred to the server when the event has occurred through monitoring of the threshold value or when the particular task has been performed by the event.

In the message, an item <CmdID> indicates a type of a particular task. An item <data> indicates a result code obtained by performing the particular task. The items <CmdID> and <data> can be included only in the message for the performing results of the task. An item <Source> indicates an address (URI) of the monitoring unit that has captured the occurrence of the particular event. An item <Meta> indicates a source number (or, identification number or the Trap ID) of the occurred event. Another <data> item indicates a variable of the occurred event.

As so far described, the DM using an event according to the present invention has many advantages as follows.

That is, because a task to be performed by the server when the server receives a report on an event from a particular terminal is previously scheduled and provided to the terminal, a waste of the network resources can be reduced.

In addition, because the routing service is provided between the elements within the terminal, the elements within the terminal can be separated.

Moreover, because the source number and the registration number are used for the routing service, the routing service can be accurately operated. Also, malfunction of the processing unit 240 can be prevented through the source number and the registration number, and performing of a task by a malicious user can be prevented.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

The invention claimed is:

1. A terminal, comprising:
a computer processor executing one or more commands to:
receive, from a server, a monitoring object and a scheduling object, wherein the monitoring object comprises an identifier number and a registration number of a specified event to be monitored and information on a condition under which the specified event occurs, and wherein the scheduling object comprises information of a specified task and trigger information referring to the specified event as a trigger for execution of the specified task when the specified event occurs, wherein the trigger information in the scheduling object corresponds to the identifier number and the registration number of the specified event;
check whether or not the server is authorized to provide the monitoring object and the scheduling object by verifying access information therein;
monitor whether the specified event occurs within the terminal if the server is verified to be authorized according to the checking of the monitoring object;
register the specified task together with trigger information referring to the specified event into the terminal so that the specified task could be executed without any direction from the server if the server is verified to be authorized according to the checking of the scheduling object;
check, when the specified event occurs, whether the identifier number and the registration number of the specified event that has occurred matches the trigger information of the specified event for the specified task registered; and
allow a processing unit specified by the trigger information to execute the specified task registered when the specified event is detected to occur,
wherein the monitoring object and the scheduling object are expressed in a form of a management tree comprising a set of elements.

2. The terminal of claim 1, wherein the computer processor further generates report data including the identifier number of the specified event and a registration number of the specified event.

3. The terminal of claim 2, wherein the trigger information corresponds to the identifier number of the specified event and the registration number of the specified event, and the trigger information is acquired from the report data generated.

4. The terminal of claim 3, wherein the computer processor further matches the identifier number and the registration number of the specified event with the trigger information registered with the specified task in order to check whether or not to execute the specified task.

5. A device management (DM) method of a terminal device using an event, the method comprising:
a) receiving, by the terminal device, a first request from a server, wherein the first request is for requesting to monitor whether or not a particular event occurs within the terminal device, and wherein the first request includes an identification number and a registration number of the particular event, and a managed object for monitoring in a form of a management tree comprising a set of elements indicating the particular event to be monitored;
b) monitoring, by the terminal device, whether or not the particular event occurs within the terminal device according to the first request;
c) receiving, by the terminal device, a second request from the server, wherein the second request is for scheduling a particular task by registering the particular task for the particular event into the terminal device so that the particular task could be performed without any direction from the server if the particular event occurs, and wherein the second request includes the identification number and the registration number with respect to the particular event, and a scheduled object in a form of a management tree comprising a set of elements indicating the particular task to be performed; and
d) performing, by the terminal device, the particular task if the particular event occurs as a result of the monitoring.

6. The method of claim 5, wherein the set of elements for the monitoring, comprises one or more of:
a first element that designates an address of a variable being as a target of the monitoring;
a second element that designates a period for sampling a value of the variable;
a third element that designates a threshold value with respect to the value of the variable;
a fourth element that indicates starting or ending of the monitoring; and
a fifth element that indicates information regarding an event to occur, when the value of the variable reaches a threshold value.

7. The method of claim 6, wherein the fifth element comprises one or more of:
an identifier element that indicates an identification number of an event to occur when the value of the variable reaches the threshold value;
a report element that indicates a target to which information on the event occurred is to be transferred; and
a schedule element that includes information regarding the particular task to be performed when the particular event occurs.

8. The method of claim 5, wherein the set of elements for the scheduling comprises one or more of:
- a first element that indicates an identifier of the particular task to be scheduled;
- a second element that indicates a state of the particular task to be scheduled;
- a third element that indicates starting or ending of the particular task to be scheduled;
- a fourth element that indicates condition(s) for performing the particular task to be scheduled; and
- a fifth element that indicates the particular task to be scheduled.

9. The method of claim 8, wherein the fourth element comprises one or more of:
- a Trap ID element that indicates the identification number of the particular event that triggers performing of the particular task to be scheduled; and
- a Registration Number element that indicates the registration number of the particular event that triggers performing of the particular task to be scheduled.

10. The method of claim 5, wherein the step c) further comprises:
- requesting a routing unit of the terminal device to transfer information on the particular event if the particular event occurs, in response to the second request.

11. The method of claim 5, wherein the step d) comprises:
- reporting, by a monitoring unit of the terminal device, information on an occurrence of the particular event to a routing unit of the terminal device;
- transferring, by the routing unit, the information to a processing unit of the terminal device; and
- performing, by the processing unit, the particular task scheduled upon receiving the information.

12. The method of claim 5, wherein the set of elements for the monitoring comprises one or more of:
- a first element that designates a time-based condition for making the particular event occur;
- a second element that designates repetitiveness of the time-based condition;
- a third element that indicates starting or ending of the monitoring; and
- a fourth element that indicates information regarding the particular event.

13. The method of claim 5, wherein the step d) further comprises one or more of:
- reporting, by the terminal device, if the particular event occurs, the occurrence to the server; and
- reporting, by the terminal device, results of the performing of the particular task to the server.

14. A device management (DM) scheduling method in a terminal device that performs device management with a server, the method comprising:
- receiving, by the terminal device, a monitoring request from the server to monitor whether an event occurs within the terminal device, wherein the monitoring request contains a monitoring object comprising an identifier number and a registration number of the event to be monitored and information on a condition under which the event occurs;
- verifying, by the terminal device, the monitoring object in order to check whether or not the server is authorized to provide the monitoring object;
- performing, by the terminal device, the monitoring of the event if the server is verified to be authorized according to the step of verifying the monitoring object;
- receiving, by the terminal device, a scheduling request from the server to schedule a task to be executed when the event occurs, wherein the scheduling request contains a scheduling object comprising information of the task and trigger information referring to the event as a trigger for the execution of the task, wherein the trigger information in the scheduling object corresponds to the identifier number and the registration number of the event;
- verifying, by the terminal device, the scheduling object in order to check whether or not the server is authorized to provide the scheduling object;
- scheduling, by the terminal device, the task by registering the task and the trigger information referring to the event into the terminal device so that the task could be executed without any direction from the server if the server is verified to be authorized according to the step of verifying the scheduling object;
- checking, by the terminal device when the event occurs, whether the identifier number and the registration number of the event that has occurred matches the trigger information of the event for the task registered; and
- allowing, by the terminal device, a processing unit specified by the trigger information to execute the task registered when the event occurs,
- wherein the monitoring object and the scheduling object are expressed in a form of a management tree comprising a set of elements.

15. The method of claim 14, wherein the task is routed to the processing unit specified by the registration number, while the task is being registered at the step of the scheduling, so that the task can be executed by the processing unit when the event occurs.

16. The method of claim 15, further comprising:
- reporting, by the terminal device, results of the execution of the task to the server,
- wherein the registration number is included in the results of the execution.

17. The method of claim 14, wherein the condition of the monitoring object supports time-based conditions.

18. The method of claim 17, wherein the information on the condition represents a specified time or a specified period of time when the event occurs.

19. The method of claim 14, wherein the condition of the monitoring object supports threshold-based conditions, and wherein the information on the condition includes address information on a specified variable to be monitored and a specified threshold so that the event occurs if the specified variable reaches the specified threshold.

* * * * *